United States Patent
Schmidt et al.

(10) Patent No.: US 7,395,124 B2
(45) Date of Patent: Jul. 1, 2008

(54) ADAPTIVE MOTOR DRIVE METHOD AND APPARATUS INCLUDING INERTIA ESTIMATOR

(75) Inventors: Peter B. Schmidt, Franklin, WI (US); Thomas Rehm, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 440 days.

(21) Appl. No.: 11/271,102

(22) Filed: Nov. 10, 2005

(65) Prior Publication Data

US 2007/0150076 A1 Jun. 28, 2007

(51) Int. Cl.
- G05B 13/02 (2006.01)
- H02P 7/00 (2006.01)
- G05B 11/42 (2006.01)

(52) U.S. Cl. .......................... 700/29; 700/41; 318/432; 318/609

(58) Field of Classification Search .................. 700/29, 700/30, 41, 42, 52; 318/609, 610, 432–434
See application file for complete search history.

(56) References Cited

U.S. PATENT DOCUMENTS 5,495,158 A * 2/1996 Schmidt et al. ............. 318/610
6,037,736 A * 3/2000 Tsuruta et al. .............. 318/609
2005/0034538 A1* 2/2005 Rehm et al. .............. 73/862.08
2005/0116677 A1* 6/2005 Tsuruta et al. .............. 318/610

FOREIGN PATENT DOCUMENTS

JP 5-284774 * 10/1993

* cited by examiner

*Primary Examiner*—Steven R. Garland
(74) *Attorney, Agent, or Firm*—Quarles & Brady, LLP; Alexander R. Kuszewski

(57) ABSTRACT

A method and apparatus for use with a plant drive system that receives a reference command signal and generates a torque command to drive a plant, the method for estimating plant inertia and comprising the steps of providing a reference model that models the plant, the model receiving the reference command signal and generating a model output signal as a function thereof, identifying a plant output signal, mathematically combining the reference command signal and the plant output signal to generate a first error value, mathematically combining the plant output signal and the model output signal to generate a second error value, mathematically combining the first and second error values to generate an inertia estimate value and using the inertia estimate value to modify the torque command thereby providing a modified torque command signal to drive the plant.

22 Claims, 10 Drawing Sheets

ADAPTIVE MOTOR DRIVE METHOD AND APPARATUS INCLUDING INERTIA ESTIMATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers and more specifically to a method and apparatus for adaptively adjusting a motor controller as a function of a real time inertia estimate.

General-purpose industrial motor drive manufacturers supply standard drives for a, large variety of applications such as fans, pumps, conveyors, and web lines. A typical drive includes, among other components, a comparator, a load velocity sensor, a proportional-integral (PI) regulator and a current regulator. The comparator receives a feedback signal from the sensor and a reference command signal (e.g., a command velocity signal) and generates a difference or error signal. The PI regulator receives the error signal and steps up that value, as the label implies, proportionally and integrally, to generate a regulated value. The regulated value is provided to the current regulator that generates a motor torque command signal for driving an associated motor/load.

Because loads and performance requirements are different for each application, typically, a standard drive has to be "tuned" for a specific application to achieve desired results (i.e., proportional and integral gain factors have to be set as a function of a specific motor (i.e., the "plant") and load driven by the drive). To properly tune a drive, ideally, system parameters such as plant inertia, friction, damping, and load must be known. During an off-line commissioning procedure (e.g., a procedure typically performed prior to normal operation of a drive), system parameters can be determined and used to tune the drive.

As known in the industry, at least some system parameters can vary over time and with different operating conditions and consequently it is difficult to keep a drive running optimally even if it is initially tuned off-line. In at least some applications inertia may vary over time.

One solution for dealing with changing operating parameters has been to develop model reference adaptive controllers (MRACs) that automatically tune a drive to follow a desired or model behavior. A block diagram of an exemplary MRAC 10 is shown in FIG. 1 and includes a controller 12, a reference model module 14, a plant 16, a summer 18 and an adaptive module 20. In FIG. 1, a reference command r is provided to reference model 14, controller 12 and adaptive module 20. A controller output u drives plant 16 to produce a plant output. A plant output signal x is sent back to controller 12 for closed loop control. A reference model output signal $x_m$ is subtracted from the plant output x to form an error signal $\epsilon$. The reference model output signal $x_m$ and the error signal $\epsilon$ are also received by adaptive module 20 which calculates new controller gain(s) K in an attempt to force the closed loop system to behave like model 14. Some known systems have used the reference command signal r to calculate gain K changes. Other known schemes have used the model output signal $x_m$ in place of reference command signal r to calculate gain K changes.

Unfortunately, prior art techniques that use the reference command signal r or the model output signal $x_m$ to calculate gain K changes drastically change the structure of the simple PI regulator control loop that has been implemented in many industrial drives.

BRIEF SUMMARY OF THE INVENTION

It has been recognized that a drive can be configured that includes a conventional PI regulator structure that adapts to changing inertia. To this end, an exemplary drive includes an adaptive module that uses the difference between a command signal and a plant output signal as well as the different between the plant output signal and an ideal model output signal to generate an inertia estimate which is in turn used to alter the output of a PI regulator to adjust for real time changes in system inertia.

Consistent with the above, at least one inventive embodiment Includes a method for use with a plant drive system that receives a reference command signal and generates a torque command to drive a plant, the method for estimating plant inertia and comprising the steps of providing a reference model that models the plant, the model receiving the reference command signal and generating a model output signal as a function thereof, identifying a plant output signal, mathematically combining the reference command signal and the plant output signal to generate a first error value, mathematically combining the plant output signal and the model output signal to generate a second error value, mathematically combining the first and second error values to generate an inertia estimate value and using the inertia estimate value to modify the torque command thereby providing a modified torque command signal to drive the plant.

In some embodiments the step of mathematically combining to generate the first error value includes subtracting the plant output signal from the reference command signal. In some cases the step of mathematically combining to generate the second error value includes subtracting the model output signal from the plant output signal. In some cases the step of mathematically combining the first and second error values includes multiplying the first error value and the second error value to generate a combined error value. In some embodiments the step of mathematically combining the first and second error values further includes the step of multiplying the combined error value by a gain function to generate the inertia estimate.

In some embodiments the step of multiplying the combined error value by a gain function includes multiplying the combined error value by $-\gamma(K_p s + K_i)/s)(e_{com})$ where $e_{com}$ is the combined error value, $K_p$ is a proportional gain value, $K_i$ is an integral gain value and g is a rate adaptation gain value. In some cases the method further includes the step of setting the adaptation gain value g to a value between zero and one.

In some cases the plant drive system also includes a current regulator that receives the modified torque command signal and uses the modified torque command signal to generate a motor torque value used to drive the plant, the method further including the step of mathematically combining the plant output signal, the motor torque value and the inertia estimate to generate a load torque estimate, the step using the inertia estimate value to modify the torque command including using both the inertia estimate value and the load torque estimate to provide a modified torque command signal to drive the plant. In some cases the step of mathematically combining the plant output signal, the motor torque value and the inertia estimate to generate a load torque estimate includes taking the derivative of the plant output signal to generate an acceleration value, multiplying the acceleration value by the inertia estimate value to generate an intermediate value and subtracting the intermediate value from the motor torque value to generate the load torque estimate.

Some embodiments include a method for use with a plant drive system that receives a reference command signal and generates a torque command to drive a plant, the method for estimating plant inertia and comprising the steps of setting an adjustment gain value, providing a reference model that models the plant, the model receiving the reference command signal and generating a model output signal as a function thereof, identifying a plant output signal, subtracting the plant output signal from the reference command signal to generate a first error value, subtracting the model output signal from the plant output signal to generate a second error value, multiplying the first and second error values to generate a combined error value, multiplying the combined error value by the adjustment gain value to generate the inertia estimate value and using the inertia estimate value to modify the torque command thereby providing a modified torque command signal to drive the plant. In some cases the adjustment gain value is $-\gamma((K_p s+K_i)/s)$, where $K_p$ is a proportional gain value, $K_i$ is an integral gain value and g is a rate adaptation gain value and wherein the step of setting the adjustment gain value includes setting values $K_p$, $K_i$ and $\gamma$ where value $\gamma$ is set to a value between zero and one.

Some embodiments include an adaptive apparatus for use with a plant drive system that receives a reference command signal and generates a torque command to drive a plant, the apparatus for estimating plant inertia and comprising a reference model that models the plant, the model receiving the reference command signal and generating a model output signal as a function thereof, a observer for identifying a plant output signal and a processor running a program to perform the steps of mathematically combining the reference command signal and the plant output signal to generate a first error value, mathematically combining the plant output signal and the model output signal to generate a second error value, mathematically combining the first and second error values to generate an inertia estimate value and using the inertia estimate value to modify the torque command thereby providing a modified torque command signal to drive the plant.

In some cases the processor mathematically combines to generate the first error value by subtracting the plant output signal from the reference command signal. In some cases the processor mathematically combines to generate the second error value by subtracting the model output signal from the plant output signal. In some cases the processor mathematically combines the first and second error values by multiplying the first error value and the second error value to generate a combined error value. In some cases the processor mathematically combines the first and second error values by further multiplying the combined error value by a gain function to generate the inertia estimate. In some cases the gain function is $\gamma((K_p s+K_i)/s)$ where $K_p$ is a proportional gain value, $K_i$ is an integral gain value and $\gamma$ is a rate adaptation gain value.

In some embodiments the plant drive system also includes a current regulator that receives the modified torque command signal and uses the modified torque command signal to generate a motor torque value used to drive the plant, the processor further performing the program to mathematically combine the plant output signal, the motor torque value and the inertia estimate to generate a load torque estimate, the processor using the inertia estimate value to modify the torque command by using both the inertia estimate value and the load torque estimate to provide a modified torque command signal to drive the plant. In some cases the processor mathematically combines the plant output signal, the motor torque value and the inertia estimate to generate a load torque estimate by taking the derivative of the plant output signal to generate an acceleration value, multiplying the acceleration value by the inertia estimate value to generate an intermediate value and subtracting the intermediate value from the motor torque value to generate the load torque estimate.

Some embodiments include an apparatus that receives a reference command signal and generates a torque command signal to drive a plant, the apparatus comprising a plant model receiving the reference command signal and generating a model output signal, an observer for identifying a plant output signal, an inertia estimator receiving the reference command signal, the plant output signal and the model output signal and generating an inertia estimate value, a proportional-integral regulator receiving the reference command signal and stepping up the reference command signal to produce a regulated value and a multiplier for multiplying the regulated value by the inertia estimate value to generate the torque command signal to drive the plant.

In some cases the inertia estimator generates the inertia estimate value by subtracting the plant output signal from the reference command signal to generate a first error value, subtracting the model output signal from the plant output signal to generate a second error value, multiplying the first and second error values to generate a combined error value and multiplying the combined error value by the adjustment gain value to generate the inertia estimate value.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

A. Development of Adaptive Equation

Figure 2:
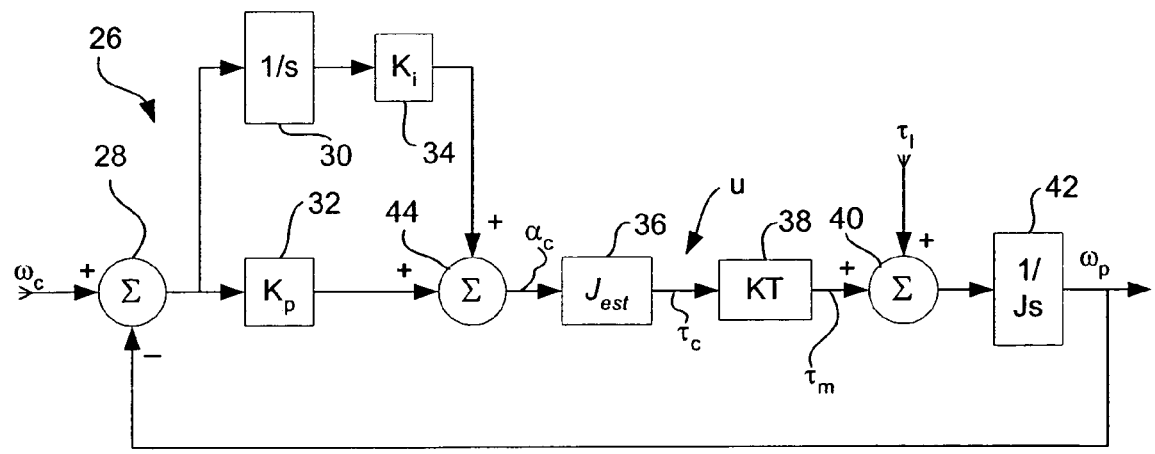
FIG. 2 is a schematic diagram illustrating a controller according to at least one embodiment of the present invention.

An exemplary controller/plant model system 26 is shown in FIG. 2 where it can be seen that a controller receives a command velocity signal $\omega_c$ and causes a plant 42 to operate at a plant velocity ωp. In addition to plant 42 that is modeled as a simpler inertia J, model 26 includes a conventional PI regulator that includes an integrator 30, an integral gain 34, a proportional gain 32 and a summer 44, an adaptive inertia estimate multiplier block 36, a current regulator modeled in block 38 and first and second summers 28 and 40, respectively. Summer 28 receives each of the command velocity signal $\omega_c$ and the plant velocity signal $\omega_p$ and subtracts the plant velocity signal $\omega_p$ from the command velocity signal to generate an error value. The error value is provided to the PI regulator which in turn generates an intermediate command signal $\alpha_c$. The proportional and integral gains $K_p$ and $K_i$ are a function of the desired damping ζ and bandwidth $\omega_n$ for the system as indicated by the following equations:

$$K_p = 2\zeta\omega_n \qquad \text{Eq. 1}$$

$$K_i = \omega_n^2 \qquad \text{Eq. 2}$$

Some optional tuning criteria may be utilized to set the values of gains $K_i$ and $K_p$. Friction, damping, and similar terms can be set to zero without appreciably effecting accuracy of the system for two reasons. First, inertia is the dominant parameter in many drive systems. Knowing the inertia is the key to tuning the system to have good base-band performance. Second, additional parameters complicate development of a workable adaptation law derivation. The intermediate command signal □c is provided to adaptive inertia estimate multiplier block 36 which, as the label implies, multiplies the intermediate command signal $\alpha_c$ by an essentially real time inertia estimate $J_{est}$ to generate a command torque value $\tau_c$.

Referring still to FIG. 2, block 38 models operation of a current regulator and related dynamics. To simplify development of the inventive adaptive control law, it can be assumed that the current regulator 38 has unity gain. Unity gain is a realistic assumption because the current loop dynamics are typically an order of magnitude or more greater than the velocity loop dynamics. Current regulator 38 receives the command torque value $\tau_c$ and uses that value to generate a motor torque value $\tau_m$.

Summer 40 receives a load torque value $\tau_l$ as well as the motor torque value $\tau_m$. The load torque value $\tau_l$ models load torque and system disturbances. Summer 40 adds the $\tau_m$ and $\tau_l$ values to generate an output that is provided to plant model block 42. Thus, the present invention contemplates a model that is consistent with a control scheme that includes a conventional PI regulator structure and an adaptive gain parameter $J_{est}$ that is equal to a real time system inertia.

Equation 3 represents the command response transfer function of the velocity output $\omega_p$ with respect to the velocity input $\omega_c$.

$$\frac{\omega_p}{\omega_c} = \frac{K_p s + K_i}{\frac{J}{J_{est}} s^2 + K_p s + K_i} \qquad \text{Eq. 3}$$

If the estimate $J_{est}$ of the inertia is equal to the plant inertia J, then the characteristic equation of the transfer function is a well-behaved second order model as defined by the parameters in Equations 1 and 2.

The disturbance rejection transfer function of the velocity output $\omega_p$ with respect to the load torque input $\tau_l$ is shown in Equation 4:

$$\frac{\omega_p}{\tau_l} = \frac{\frac{1}{J} s}{\frac{J}{J_{est}} s^2 + K_p s + K_i} \qquad \text{Eq. 4}$$

Equation 4 has the same dynamics as the transfer function shown in Equation 3 and both transfer functions demonstrate optimal performance with large gain values $K_p$ and Ki. The magnitudes of gains $K_p$ and $K_i$ are limited by the physical properties of the torque producing components in the system.

Figure 1:
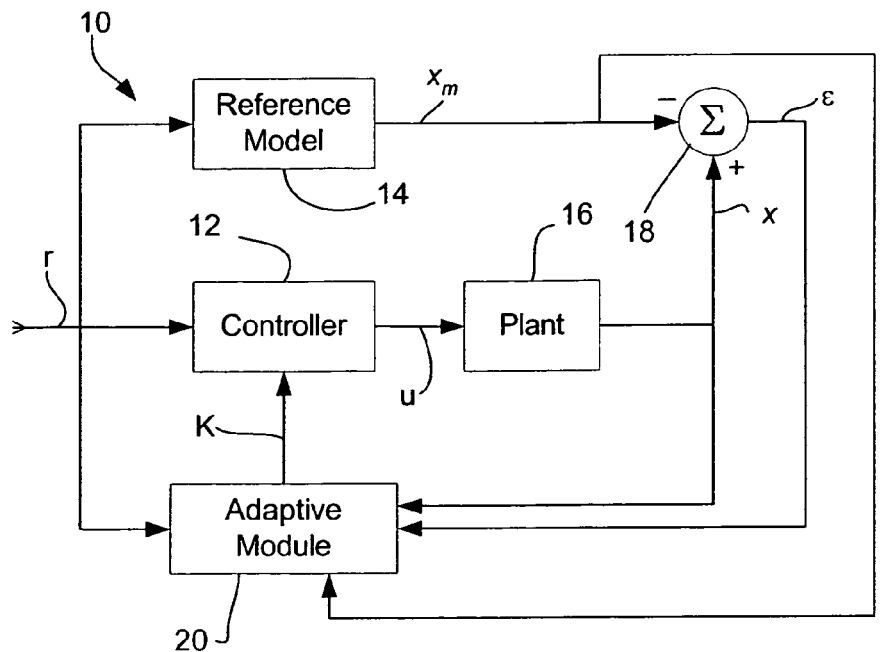
FIG. 1 is a schematic diagram illustrating an exemplary model reference adaptive controller.

Referring again to FIG. 2, the reference command signal $\omega_c$, plant output signal $\omega_p$ and output of block 36 may be represented by labels r, x and u, respectively, to be consistent with the labels in FIG. 1. Here, utilizing a state space notation where the current regulator gain is unity, the plant 42 $output_x$ can be represented as:

$$\dot{x} = ax + bu \qquad \text{Eq. 5}$$

where a=0 and b=1/J.

In the case of the model, it is assumed that the inertia estimate $J_{est}$ is equal to the actual plant inertia J (i.e., $J_{est}$ and J in Equation 3 above cancel) and therefore the model output can be represented by the following equation:

$$x_m = \frac{K_p s + K_i}{s^2 + K_p s + K_i} r \qquad \text{Eq. 6}$$

or equivalently:

$$x_m = \frac{2\xi\omega_n s + \omega_n^2}{s^2 + 2\xi\omega_n s + \omega_n^2} r \qquad \text{Eq. 7}$$

where $K_p$ and $K_i$ are defined in Equations 1 and 2 above. Here, because the model as shown in FIG. 2 includes a conventional PI regulator, a control law representing the output signal of block 36 can be represented by the following equation:

$$u = \kappa * \left(\frac{K_p s + K_i}{s}\right)(r - x) \qquad \text{Eq. 8}$$

where $\kappa^*$ is an unknown optimal gain. Gains $K_p$ and $K_i$ are the PI regulator gains and (r−x) is the error between the reference command signal r and the actual plant output signal x.

Equations 5 and 8 can be combined and the terms rearranged to yield the following equation:

$$\frac{x}{r} = \frac{b\kappa * K_p s + b\kappa * K_i}{s^2 (b\kappa * K_p - \alpha)s + b\kappa * K_i} \qquad \text{Eq. 9}$$

Equations 6 and 9 can be combined to yield the following relationships:

$$\frac{x}{r} = \frac{b\kappa * K_p s + b\kappa * K_i}{s^2 + (b\kappa * K_p - \alpha)s + b\kappa * K_i} = \frac{K_p s + K_i}{s^2 + K_p s + k_i} = \frac{x_m}{r} \qquad \text{Eq. 10}$$

Thus, the optimal gain $\kappa^*$ is equal to the instantaneous plant inertia J (i.e., where b=1/J, $\kappa^*$ cancels b if $\kappa^*$=J). In Equation 10, note that factor a has an assumed zero value.

Thus, an adaptive law can be established by starting with the desired result that:

$$\dot{x} = \dot{x}_m \qquad \text{Eq. 11}$$

and the error between the actual plant output x and model output $x_m$ can be expressed by the following equation:

$$e = x - x_m = \varepsilon = \frac{b}{s + K_p + K_i \frac{1}{s}} \tilde{k}\left(\frac{K_p sK + K_i}{s}\right)(r - x) \qquad \text{Eq. 12}$$

where $\tilde{k}=k-k^*$, k is the active gain in the controller and $k^*$ is the desired gain or parameter value.

Assuming a strictly positive real (SPR) Lyapunov function, then:

$$v = \frac{\varepsilon^2}{2} + \frac{\tilde{k}^2}{2\gamma}|b| \qquad \text{Eq. 13}$$

And the time derivative can be expressed as:

$$\dot{V} = \varepsilon\dot{\varepsilon} + \frac{\tilde{k}}{\gamma}|b|\dot{\tilde{k}} \qquad \text{Eq. 14}$$

After finding $\dot{\varepsilon}$ and substituting into Equation 14, the following adaptation law results:

$$\dot{\tilde{k}} = -\gamma sgn(b)\left(\frac{K_p s + K_i}{s}\right)(r - x)\varepsilon \qquad \text{Eq. 15}$$

where γ is a positive adaptation rate gain and (r−x)ε is a combined error value $e_{com}$.

The adaptation law represented by Equation 15 differs from previous laws because the gain is a function of two error signals. The first error signal ε represents the difference between the reference model output $x_m$ and the plant output x. The second error (r−x) represents the difference between the reference command signal r and the plant output x. The proportional and integral gains from the controller are also present in the adaptive law. The sign function of b (i.e., sgnb), can be ignored because parameter b is equal to the inertia of the system which is always positive.

B. Simulation Results

Figure 3:
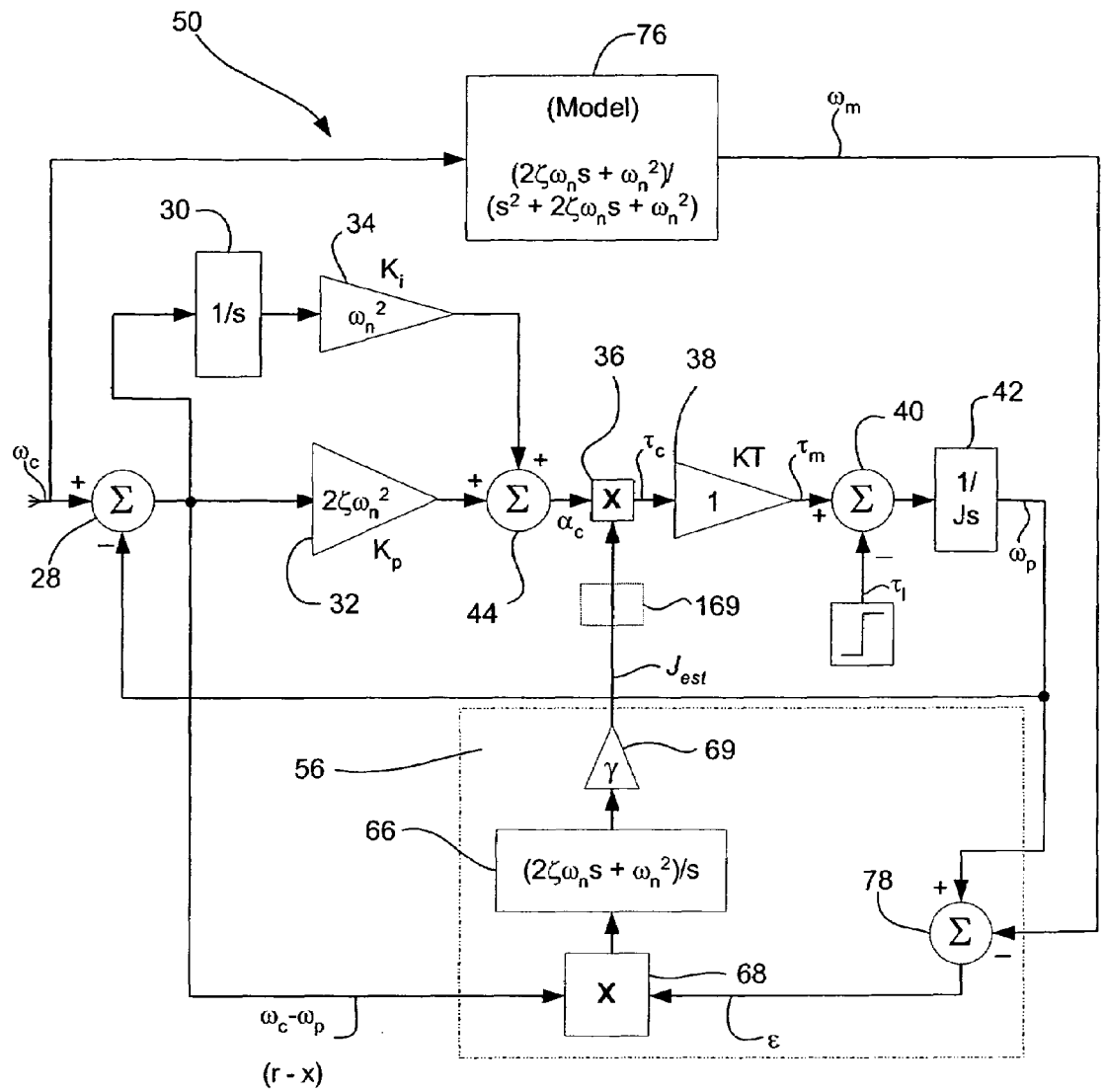
FIG. 3 is similar to FIG. 2, albeit including a model module and an adaptive module according to at least some embodiments of the present invention.

The adaptive law and inertia estimate represented by Equation 15 can be used to modify FIG. 2 resulting in the controller 50 of FIG. 3 linked to plant model 42. Controller 50 includes summers 28, 44 and 40, a PI regulator including components 30, 34 and 32, an adaptive inertia estimate multiplier block 36 and a current regulator 38 in common with the controller of FIG. 2. In addition, controller 50 includes a reference model module 76 and an adaptive module 56. Model module 76 receives the reference command velocity signal $\omega_c$ and outputs a model signal $\omega_m$ consistent with Equation 7 above.

Adaptive module 56 implements the Equation 15 adaptive law. To this end, module 56 includes a summer 78, a multiplier block 68, a PI gain block 66 and an adaptation rate gain block 69. Summer 78 receives the model output signal $\omega_m$ and the plant output signal $\omega_p$ and subtracts the model signal $\omega_m$ from the plant output signal $\omega_p$ to generate error value ε. Multiplier block 68 multiplies the error from summer 28 by error ε and its output is provided to block 66. Block 66 proportionally and integrally steps up the output of block 68 and provides its output to adaptation rate gain block 69 which in turn generates inertia estimate $J_{est}$ which is provided to block 36 for stepping up intermediate command signal $\alpha_c$.

For the purposes of the simulation, the reference model and closed loop system were chosen to be critically damped with ζ=1 and to have a bandwidth ωn=10 rad/sec and the adaptive rate gain γ was set to 0.5. In a per unit system, when rated torque=1 is applied to the system, the time it takes to reach rated velocity=1 is the equivalent system inertia with units of seconds. In the exemplary simulation here, inertia J=0.6 sec.

Figure 4:
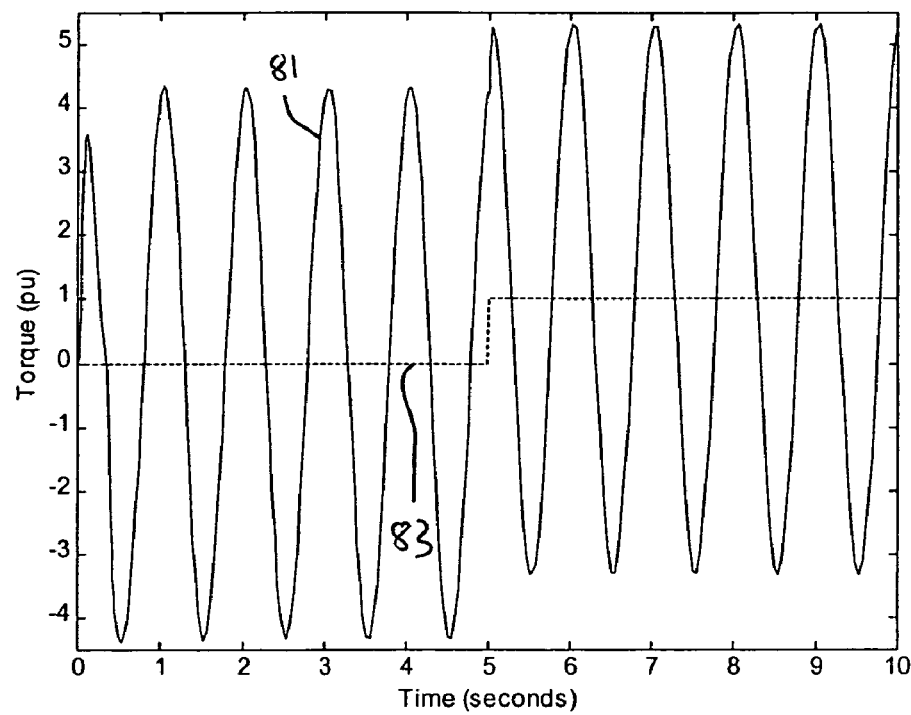
FIG. 4 is a graph illustrating motor torque and load torque related to a first simulation using the controller of FIG. 3.

Referring to FIG. 4, during the simulation, a sinusoidal velocity command 81 was applied to the system with an amplitude of 1 and a frequency of 1 Hz. A step load 83 disturbance=1 was applied at 5 seconds. Resulting velocity profiles including a command velocity 21, a model velocity 23 and a plant velocity 25 are shown in FIG. 5.

Figure 5:
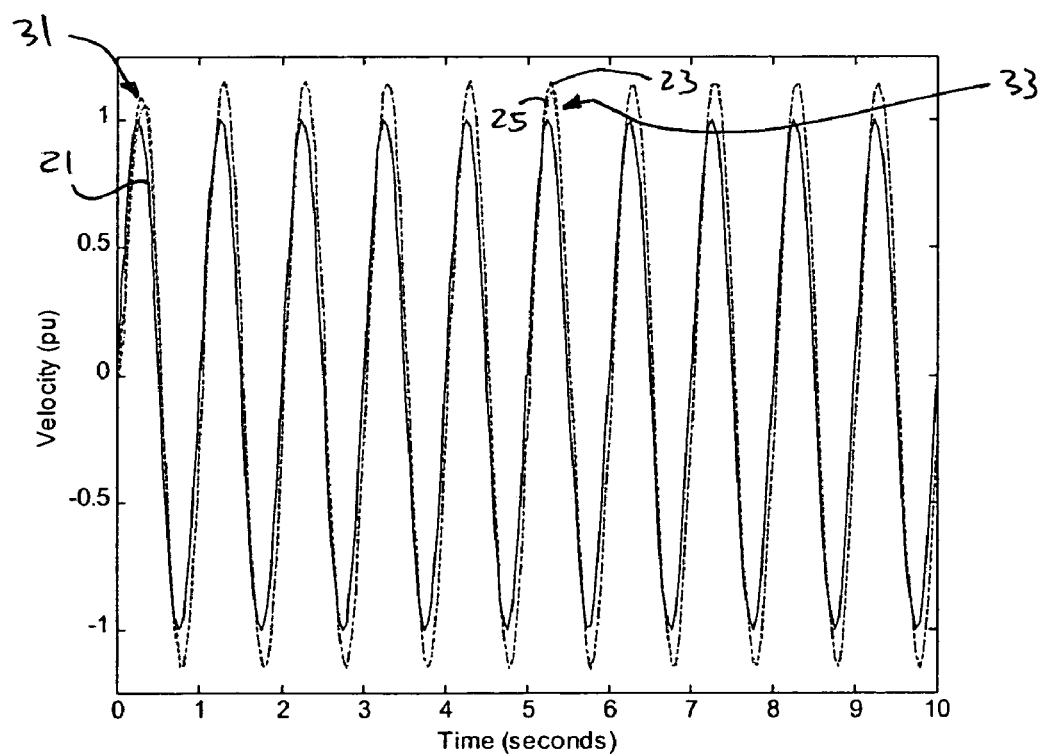
FIG. 5 is a graph illustrating a command velocity signal, a model output signal and a plant output signal that result during a first simulation using the controller of FIG. 3.

As seen in FIG. 5, model velocity 23 follows the command velocity 21 with a slight lag and 15% overshoot because of the chosen design parameters and command frequency. Plant velocity 25 identically tracks (and hence is difficult to discern) the command velocity 21 (i.e., the reference signal) except during start-up (i.e., just after time 0 in FIG. 4—see 31) and when the load is applied (i.e., just after the 5 second in FIG. 4—see 33).

Figure 6:
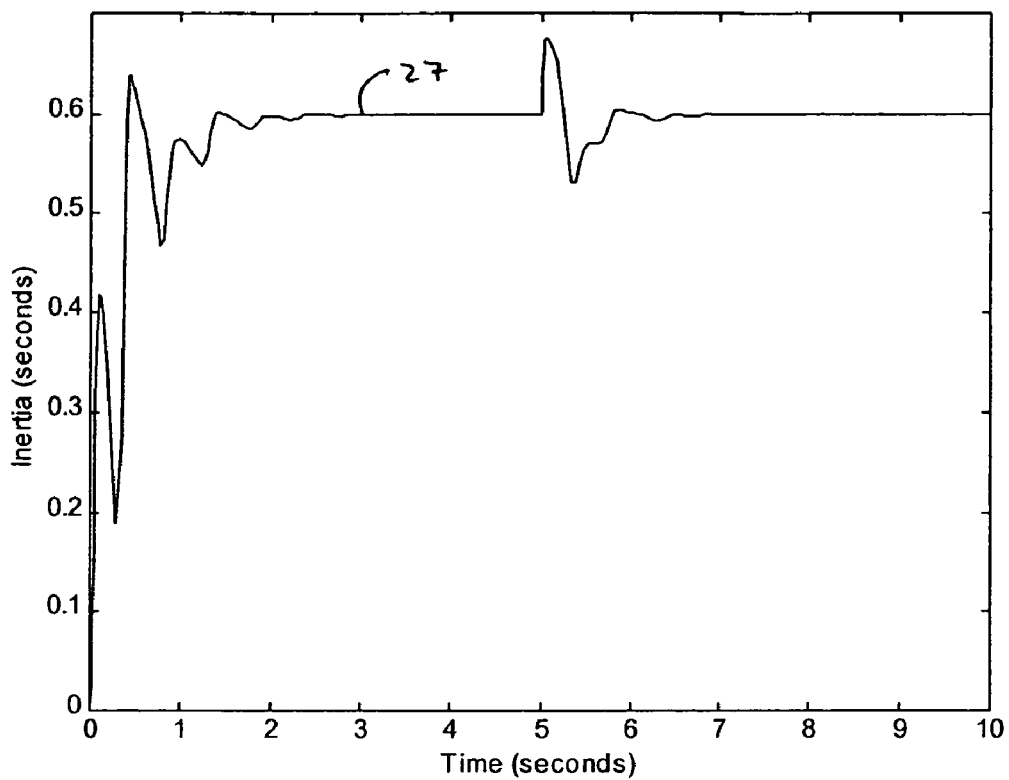
FIG. 6 is a graph illustrating a changing inertia estimate curve that results from the first simulation using the controller of FIG. 3.

Referring to FIG. 6, a graph illustrating the adaptive inertia estimate signal 27 is shown for the above described simulation. In FIG. 6 it can be seen that the system inertia is quickly and adaptively identified after startup with some overshoot. When the disturbance is applied at the 5 second time, the inertia estimate is refigured within a short time.

Referring again to FIG. 3, if current regulator 38 becomes saturated, the adaptive module must be controlled so that the inertia estimate does not continue to integrate up to an incorrect value. Thus, if current regulator 38 becomes saturated, the adaptation mechanism is held constant or disabled in at least some applications.

Figure 7:
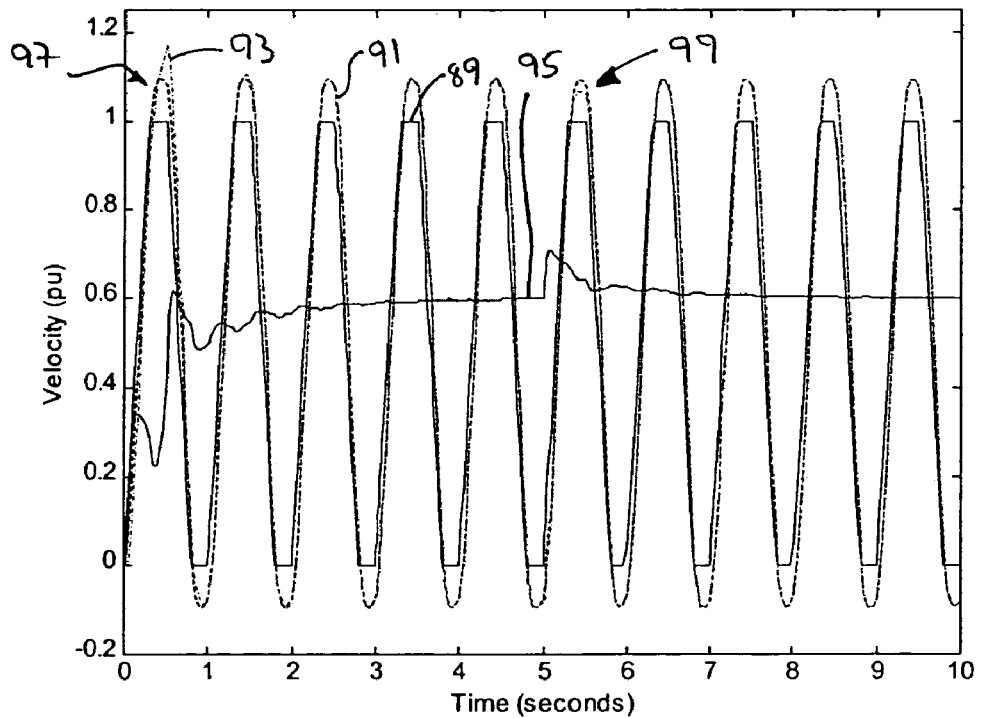
FIG. 7 is a graph illustrating command, model and plant velocity signals as well as an inertia curve generated during a second simulation using the circuit of FIG. 2.

As illustrated in FIG. 5, in the previous simulation, the velocity command was sinusoidal. A more typical velocity command may have a trapezoidal profile. To this end, referring to FIG. 7, during a second simulation a velocity command signal 89 was ramped up and down over a time period of 0.3 sec with a dwell time of 0.2 sec both at unity and 0 velocities. Also shown in FIG. 7 are a model output signal 91, a plant output signal 93 and an inertia estimate curve 95. Inertia curve 95 has the same axis as the velocity signals with units of seconds. It should be appreciated that the inertia estimate with the trapezoidal excitation has a smoother profile than the estimate with the sinusoidal excitation as illustrated in FIG. 6. Once again the model output signal 91 slightly lags the reference or command signal 89 and overshoots the command signal by approximately 15%. The plant output signal 93 tracks the mode output signal 91 well and only deviates during start up (see 97) and when the load torque is applied at the five second time (see 99).

Figure 8:
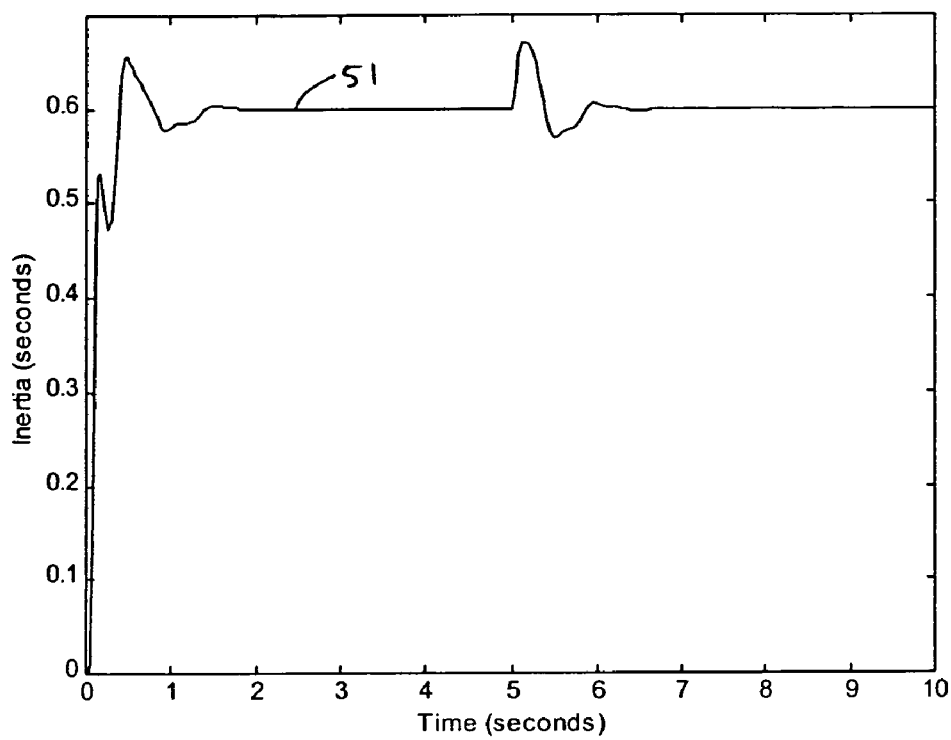
FIG. 8 is a graph illustrating an inertia estimate curve similar to the curve illustrated in FIG. 6, albeit derived using a controller that included a low pass filter in series with the adaptive module of FIG. 3.

Plant inertia in industrial applications usually changes slowly over time. For this reason, in at least some applications, a filter can be added in series with the inertia estimate loop to eliminate or reduce oscillations that occur in the inertia estimate. In addition, a filter helps eliminate disturbances that occur when a load torque is applied to the system. The sinusoidal excitation that produced the curves in FIGS. 5 and 6 was repeated with a first order low pass filter (LPF) in series with module 69 (see phantom 169 in FIG. 3) with a time constant of $\tau=0.12$ seconds. The resulting inertia estimate signal 51 is shown in FIG. 8. Comparing the inertia curves in FIGS. 6 and 8, the inertia estimate determination in FIG. 8 is relatively smoother when a filter is added to the inertia estimate path. In addition to the filter, a rate limiter and/or saturation filter could be placed in series with the inertia estimate branch of the controller configured in FIG. 3.

Figure 9:
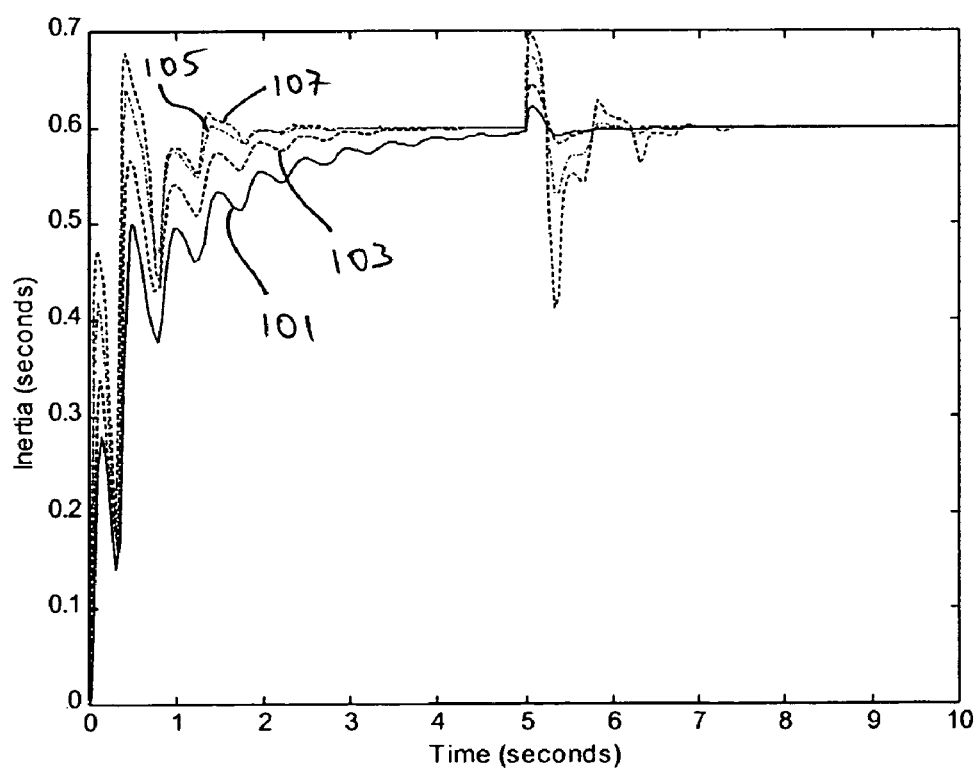
FIG. 9 is a graph illustrating inertia estimate curves generated with different adaptation rate gain values where the rate gain values were 0.1, 0.2, 0.5 and 1.0.

To show the effects of gain $\gamma$ on the rate at which the adaptive module 56 calculates the inertia estimate, simulations were run with different values of $\gamma$. FIG. 9 shows inertia estimate curves 101, 103, 105 and 107 that correspond to $\gamma$ values of 0.1; 0.2; 0.5 and 1.0, respectively, where the plant inertia J was equal to 0.6 seconds for all four simulations. During these simulations no filters where placed in series with the inertia estimate and the control parameters were set to $\zeta=1$ and $\omega n=10$ rad/sec. It can be seen that as value $\gamma$ is increased toward one, the inertia estimate is calculated more quickly but that the overshoot becomes greater.

Figure 10:
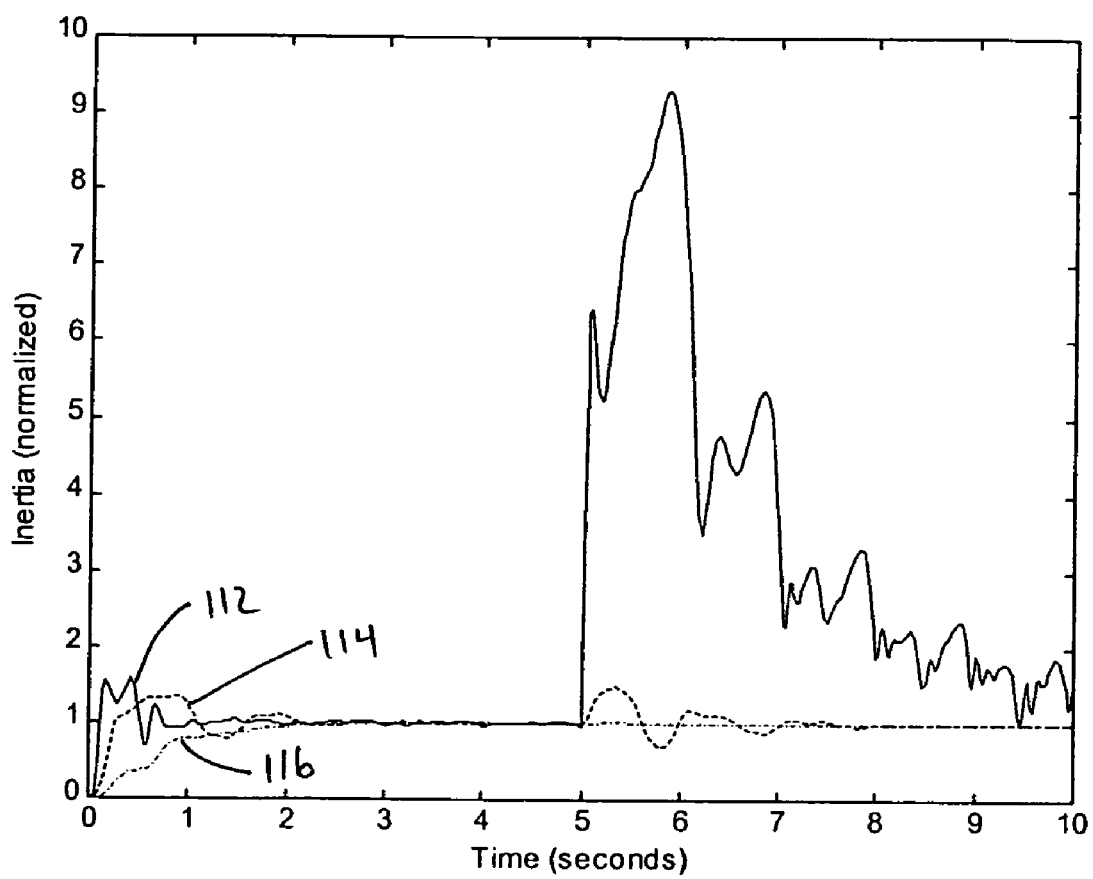
FIG. 10 is a graph illustrating different inertia estimate curves given a single adaptation rate gain value γ where system inertias were 0.04, 04 and 4.0.

For a given rate gain $\gamma$, the adaptive module can identify a wide range of inertia values depending on the plant included in a system. FIG. 10 includes curves 112, 114 and 116 corresponding to inertia values of 0.04 seconds, 0.4 seconds and 4.0 seconds, respectively, that were identified with a fixed gain $\gamma=0.75$. For comparison, the inertia estimates were normalized for the plot by dividing through by the actual inertia. To generate the FIG. 10 curves, a LPF was placed in series with the inertia estimate where the filter had a time constant $\tau=0.75$ sec and parameters $\zeta$ and $\omega n$ were set to 1 and 4 rad/second, respectively. It can be seen that as the system inertia value decreases, at startup the adaptive module requires less time to accurately estimate the inertia but overshoot is greater. It can also be seen that when the system inertia is very small, a load torque disturbance has a large affect on the transient inertia estimate and that after a disturbance it takes a relatively long time for the inertia estimate to be accurately redetermined.

Figure 11:
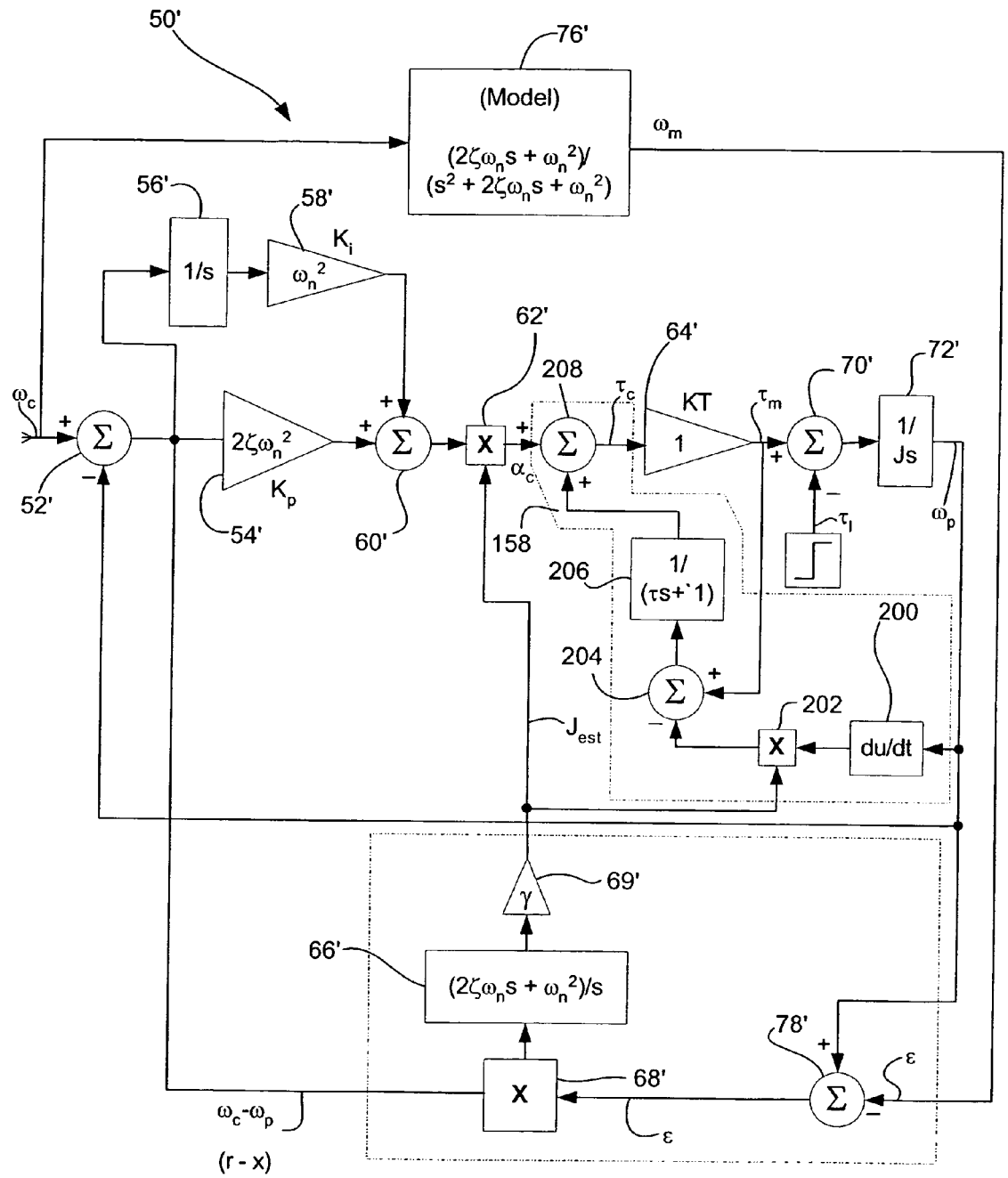
FIG. 11 is a schematic diagram illustrating a controller similar to the controller of FIG. 3, albeit including a load observer module.

In at least some cases where system inertia is small, an additional estimator to identify the load torque is helpful to reduce the error in the transient inertia estimate. To this end, FIG. 11 illustrates another controller configuration 50' that is linked to a plant 42' that, in addition to the components described above, includes a load estimator 158. In FIG. 11, components that are common with the components of FIG. 3 are identified by the same numeric labels followed by a prime. For instance, the current regulators in FIGS. 3 and 11 are referenced via numbers 38 and 38', respectively, the motor models are represented by numerals 72 and 72', respectively, etc. Components that are common among controllers 50 and 50' are not described again here in detail in order to simplify this explanation.

Referring still to FIG. 11, load estimator 158 includes a derivative module 200, a multiplier block 202, first and second summers 204 and 208 and a low pass filter block 206. Derivative module 200 receives the plant output signal $\omega_p$ and, as the label implies, calculates the derivative thereof to generate an acceleration signal that is provided to block 202. Block 202 receives the acceleration signal and multiplies that signal by the inertia estimate $J_{est}$ providing its output to summer 204. Summer 204 subtracts the value received from block 202 from the motor torque value $\tau_m$ to generate a load torque estimate $\tau_{lest}$ that is filtered by filter 206. Summer 208 receives the filtered torque estimate $\tau_{lest}$ and the intermediate value $\alpha_c$ and adds those two values to generate a command torque value $\tau_c$ which is provided to current regulator 38. Here, the LPF 206 is included to filter out the high frequency noise generated by taking the derivative via block 200.

Figure 12:
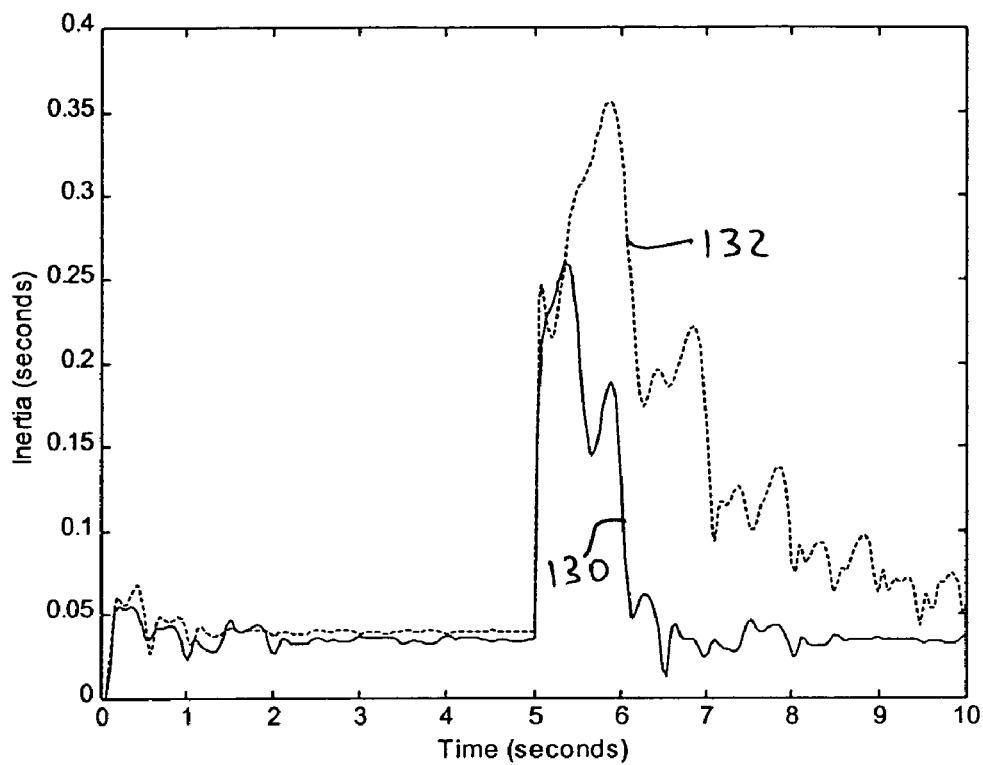
FIG. 12 is a graph illustrating inertia estimate curves generated with and without the load observer module of FIG. 11.

Referring to FIG. 12, a graph illustrates inertia estimate curves 130 and 132 with and without the load torque estimator in place, respectively, where the plant inertia was 0.04 seconds, the design parameters were $\zeta=1$ and $\omega n=4$ rad/second, the rate gain was $\gamma=0.75$ and the adaptation filter time constant and load observer filter time constant were 0.75 and 0.1 seconds, respectively. As illustrated, the load observer reduced the inertia estimate overshoot by approximately 30%. The proportional gain $K_p$ in the adaptive module 56 contributes to an aggressive inertia estimate. The LPF helps to reduce the noise in the estimate.

Figure 13:
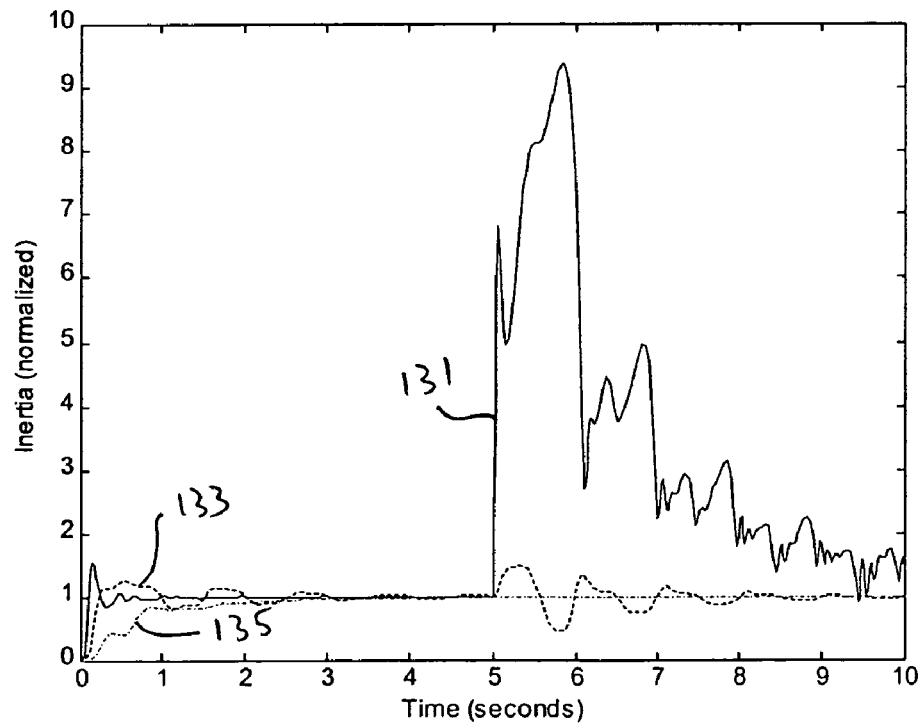
FIG. 13 is a graph illustrating inertia estimate curves generated using the controller of FIG. 11 where the proportional gain was set to zero and the low pass filter was removed.

Referring again to FIG. 11, it has been recognized that similar results can be achieved by eliminating the proportional gain in the adaptive module and eliminating the LPF 206. The simulation conditions used to generate the curves in FIG. 10 were reproduced with $K_p=0$ and $K_i=\omega_n^2$ for the adaptive module and the resulting normalized inertia curves 131, 133 and 135 are shown in FIG. 13 for inertia values of 0.04, 0.4 and 4.0, respectively. Comparing FIGS. 10 and 13, it can be seen that similar inertia estimates are produced with only integral gain versus proportional-integral gain. In addition, LPF 206 (see again FIG. 11) does not have to be implemented where the proportional gain is set to a zero value.

Figure 14:
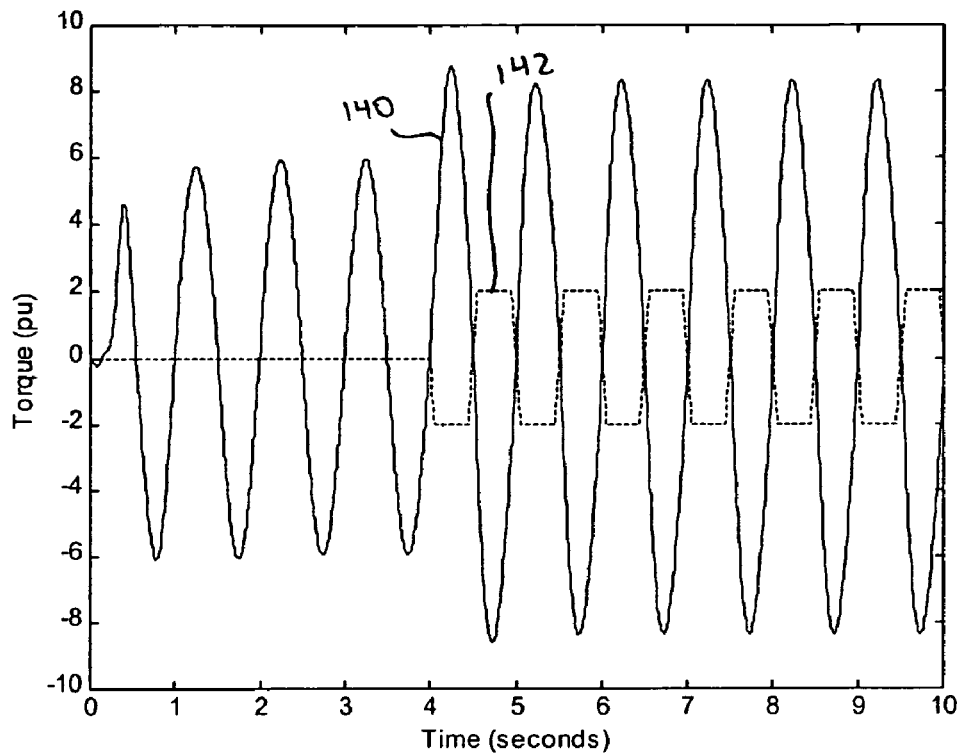
FIG. 14 is a graph illustrating motor torque and load torque curves similar to the curves shown in FIG. 4.

One final simulation applied a clipped sinusoidal type load disturbance where a velocity command signal was sinusoidal. FIG. 14 is a graph including curves of the motor torque 140 required to drive the motor to follow the velocity command and the load torque disturbance 142. The clipped sinusoidal load torque was applied after 4 seconds. This disturbance signal was programmed to have the same magnitude and frequency as the motor command torque and to be 180 degrees out of phase. Consequently, the load disturbance was always opposing the motion of the motor and drive. The peak magnitude of the load disturbance sine wave was clipped to hold a constant value of 2 pu torque.

Figure 15:
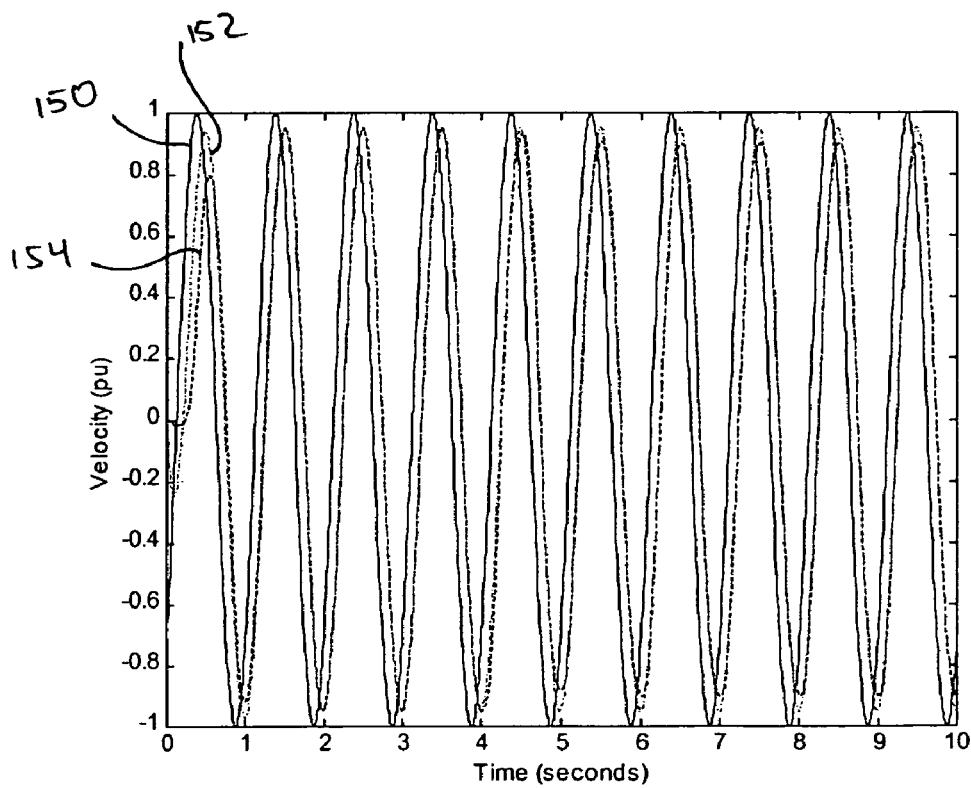
FIG. 15 is a graph illustrating command, plant and model velocity signals during one additional simulation using the controller of FIG. 11.

The resulting velocity signal curves are shown in FIG. 15 and include a command velocity 150, a model output velocity 152 and a plant output velocity 154. As illustrated, the plant output velocity signal 154 quickly tracks the model signal 152 until there is a slight drop in magnitude when the load signal is applied at four seconds. After the four second time, the adaptation algorithm quickly recovers and corrects the velocity feedback signal.

Figure 16:
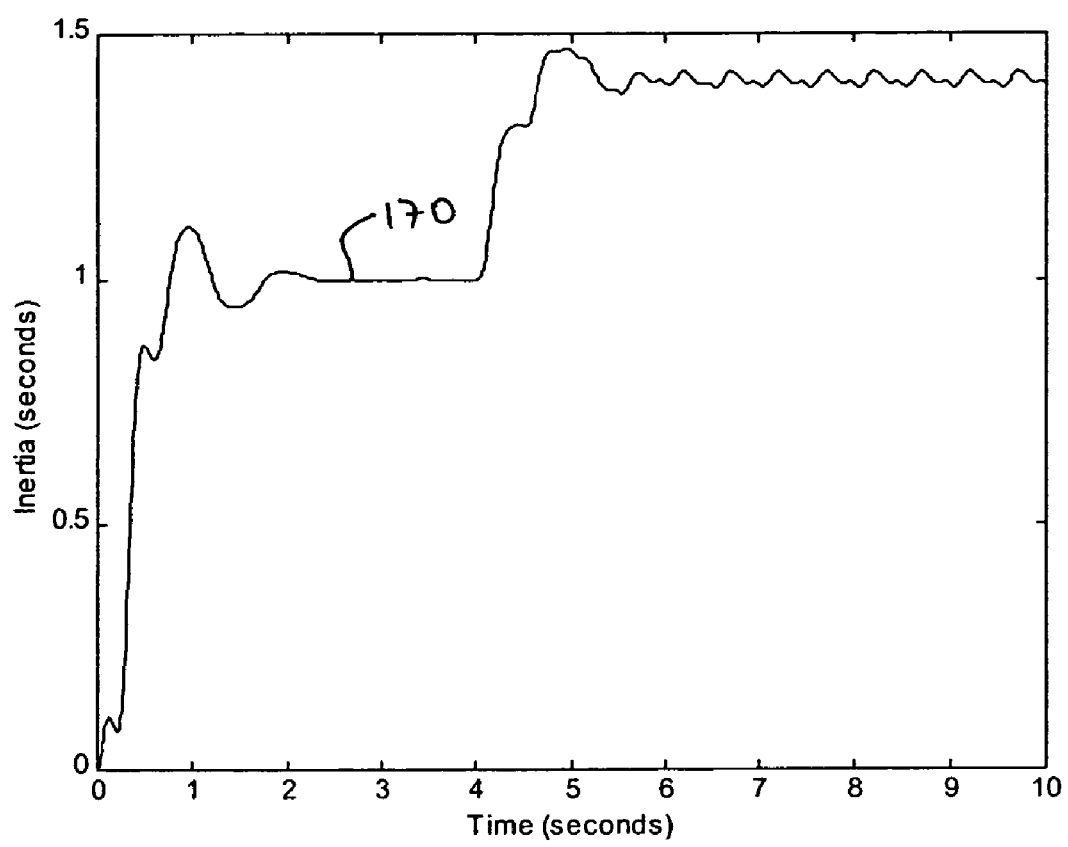
FIG. 16 is a graph similar to FIG. 6, albeit illustrating an inertia estimate curve resulting from one additional simulation.

The inertia estimate curve 170 corresponding to the curves in FIG. 15 is shown in FIG. 16. The inertia estimate integrates up to the programmed value of 1 pu. When the load torque is applied after 4 seconds, the inertia estimate continues to integrate higher. The new steady state value has a mean of 1.4 seconds. The motor controller observes an opposing torque in the lower velocity feedback signal. The controller increases motor torque command to overcome the disturbance. The adaptation mechanism integrates to a higher value because it interprets the higher torque signal as an increase in inertia. Thus, it should be appreciated that the adaptive module 56 cannot distinguish between an increase in inertia and a load torque signal that always opposes motion of the regulator.

Although not presented here, experimental results substantially confirmed the simulation results described above.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for use with a plant drive system that receives a reference command signal and generates a torque command to drive a plant, the method for estimating plant inertia and comprising the steps of:
providing a reference model that models the plant, the model receiving the reference command signal and generating a model output signal as a function thereof;
identifying a plant output signal;
mathematically combining the reference command signal and the plant output signal to generate a first error value;
mathematically combining the plant output signal and the model output signal to generate a second error value;
mathematically combining the first and second error values to generate a plant inertia estimate value; and
using the inertia estimate value to modify the torque command thereby providing a modified torque command signal to drive the plant.

2. The method of claim 1 wherein the step of mathematically combining to generate the first error value includes subtracting the plant output signal from the reference command signal.

3. The method of claim 2 wherein the step of mathematically combining to generate the second error value includes subtracting the model output signal from the plant output signal.

4. The method of claim 3 wherein the step of mathematically combining the first and second error values includes multiplying the first error value and the second error value to generate a combined error value.

5. The method of claim 4 wherein the step of mathematically combining the first and second error values further includes the step of multiplying the combined error value by a gain function to generate the inertia estimate.

6. The method of claim 5 wherein the step of multiplying the combined error value by a gain function includes multiplying the combined error value by $-\gamma((K_p s + K_i)/s)(e_{com})$ where $e_{com}$ is the combined error value, $K_p$ is a proportional gain value, $K_i$ is an integral gain value, $s$ is the Laplace variable, and $\gamma$ is a rate adaptation gain value.

7. The method of claim 6 further including the step of setting the adaptation gain value $\gamma$ to a value between zero and one.

8. The method of claim 1 wherein the plant drive system also includes a current regulator that receives the modified torque command signal and uses the modified torque command signal to generate a motor torque value used to drive the plant, the method further including the step of mathematically combining the plant output signal, the motor torque value and the inertia estimate to generate a load torque estimate, the step using the inertia estimate value to modify the torque command including using both the inertia estimate value and the load torque estimate to provide a modified torque command signal to drive the plant.

9. The method of claim 8 wherein the step of mathematically combining the plant output signal, the motor torque value and the inertia estimate to generate a load torque estimate includes taking the derivative of the plant output signal to generate an acceleration value, multiplying the acceleration value by the inertia estimate value to generate an intermediate value and subtracting the intermediate value from the motor torque value to generate the load torque estimate.

10. A method for use with a plant drive system that receives a reference command signal and generates a torque command to drive a plant, the method for estimating plant inertia and comprising the steps of:
setting an adjustment gain value;
providing a reference model that models the plant, the model receiving the reference command signal and generating a model output signal as a function thereof;
identifying a plant output signal;
subtracting the plant output signal from the reference command signal to generate a first error value;
subtracting the model output signal from the plant output signal to generate a second error value;
multiplying the first and second error values to generate a combined error value;
multiplying the combined error value by the adjustment gain value to generate a plant inertia estimate value; and
using the inertia estimate value to modify the torque command thereby providing a modified torque command signal to drive the plant.

11. The method of claim 10 wherein the adjustment gain value is $-\gamma((K_p s+K_i)/s)$, where $K_p$ is a proportional gain value, $K_i$ is an integral gain value and $\gamma$ is a rate adaptation gain value, s is the Laplace variable, and wherein the step of setting the adjustment gain value includes setting values $K_p$, $K_i$ and $\gamma$ where value $\gamma$ is set to a value between zero and one.

12. An adaptive apparatus for use with a plant drive system that receives a reference command signal and generates a torque command to drive a plant, the apparatus for estimating plant inertia and comprising:
- a reference model that models the plant, the model receiving the reference command signal and generating a model output signal as a function thereof;
- a observer for identifying a plant output signal; and
- a processor running a program to performing the steps of:
  - mathematically combining the reference command signal and the plant output signal to generate a first error value;
  - mathematically combining the plant output signal and the model output signal to generate a second error value;
  - mathematically combining the first and second error values to generate an inertia estimate value; and
  - using the inertia estimate value to modify the torque command thereby providing a modified torque command signal to drive the plant.

13. The apparatus of claim 12 wherein the processor mathematically combines to generate the first error value by subtracting the plant output signal from the reference command signal.

14. The apparatus of claim 12 wherein the processor mathematically combines to generate the second error value by subtracting the model output signal from the plant output signal.

15. The apparatus of claim 14 wherein the processor mathematically combines the first and second error values by multiplying the first error value and the second error value to generate a combined error value.

16. The apparatus of claim 15 wherein the processor mathematically combines the first and second error values by further multiplying the combined error value by a gain function to generate the inertia estimate.

17. The apparatus of claim 16 wherein the gain function is $-\gamma((K_p s+K_i)/s)$ where $K_p$ is a proportional gain value, $K_i$ is an integral gain value and $\gamma$ is a rate adaptation gain value.

18. The apparatus of claim 12 wherein the plant drive system also includes a current regulator that receives the modified torque command signal and uses the modified torque command signal to generate a motor torque value used to drive the plant, the processor further performing a program to mathematically combine the plant output signal, the motor torque value and the inertia estimate to generate a load torque estimate, the processor using the inertia estimate value to modify the torque command by using both the inertia estimate value and the load torque estimate to provide a modified torque command signal to drive the plant.

19. The apparatus of claim 18 wherein the processor mathematically combines the plant output signal, the motor torque value and the inertia estimate to generate a load torque estimate by taking the derivative of the plant output signal to generate an acceleration value, multiplying the acceleration value by the inertia estimate value to generate an intermediate value and subtracting the intermediate value from the motor torque value to generate the load torque estimate.

20. An apparatus that receives a reference command signal and generates a torque command signal to drive a plant, the apparatus comprising:
- a plant model receiving the reference command signal and generating a model output signal;
- an observer for identifying a plant output signal;
- an inertia estimator receiving the reference command signal, the plant output signal and the model output signal and generating an inertia estimate value;
- a proportional-integral regulator receiving the reference command signal and performing proportional and integration operations on the reference command signal to produce a regulated value; and
- a multiplier for multiplying the regulated value by the inertia estimate value to generate the torque command signal to drive the plant.

21. The apparatus of claim 20 wherein the inertia estimator comprises means for generating the inertia estimate value by:
- subtracting the plant output signal from the reference command signal to generate a first error value;
- subtracting the model output signal from the plant output signal to generate a second error value;
- multiplying the first and second error values to generate a combined error value; and multiplying the combined error value by an adjustment gain value to generate the inertia estimate value.

22. The apparatus of claim 21 wherein the adjustment gain value is $-\gamma((K_p s+K_i)/s)$, where $K_p$ is a proportional gain value, $K_i$ is an integral gain value, s is the Laplace variable, and $\gamma$ is a rate adaptation gain value between zero and one.

* * * * *